United States Patent
Okitsu

(10) Patent No.: US 11,552,513 B2
(45) Date of Patent: Jan. 10, 2023

(54) ROTOR AND ROTATING MACHINE

(71) Applicant: MEIDENSHA CORPORATION, Tokyo (JP)

(72) Inventor: Takashi Okitsu, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/760,605

(22) PCT Filed: Jul. 8, 2020

(86) PCT No.: PCT/JP2020/026653
§ 371 (c)(1),
(2) Date: Mar. 15, 2022

(87) PCT Pub. No.: WO2021/053937
PCT Pub. Date: Mar. 25, 2021

(65) Prior Publication Data
US 2022/0344986 A1    Oct. 27, 2022

(30) Foreign Application Priority Data

Sep. 19, 2019    (JP) .............................. JP2019-170825

(51) Int. Cl.
*H02K 1/22*    (2006.01)
*H02K 1/28*    (2006.01)
*H02K 1/27*    (2022.01)
*H02K 1/276*   (2022.01)

(52) U.S. Cl.
CPC ........... *H02K 1/223* (2013.01); *H02K 1/2773* (2013.01); *H02K 1/28* (2013.01)

(58) Field of Classification Search
CPC ........ H02K 1/223; H02K 1/2773; H02K 1/28; H02K 1/24; H02K 1/26
See application file for complete search history.

(56) References Cited

U.S. PATENT DOCUMENTS

2011/0291515 A1    12/2011    Li et al.
2022/0029512 A1*    1/2022    Hidaka ................... H02K 1/223

FOREIGN PATENT DOCUMENTS

| CN | 101662197 A | 3/2010 | |
| JP | 2014-003881 A | 1/2014 | |
| JP | 2014-7787 A | 1/2014 | |
| JP | 2014-192907 A | 10/2014 | |
| JP | 2016-220393 A | 12/2016 | |
| JP | 6355592 B2 | 7/2018 | |
| WO | WO-2014188505 A1 * | 11/2014 | ........... H02K 21/042 |

* cited by examiner

*Primary Examiner* — Thomas Truong
(74) *Attorney, Agent, or Firm* — Foley & Lardner LLP

(57) ABSTRACT

Provided is a rotor 10 capable of avoiding an increase in cost due to use of a high-performance winding machine and an increase in cost due to molding of the entire rotor 10 with an insulator, and a rotating machine including the rotor 10. The rotor 10 includes a rotor core 11 that rotates around a rotary axis A. The rotor core 11 includes a plurality of unit through holes 11a that individually accommodate each of a plurality of winding units 12. Each of the plurality of winding units 12 includes an iron core, a field winding wound around the iron core, and an insulating sealing resin that seals the iron core and the field winding, and is accommodated in the unit through hole 11a in a posture extending in a direction of the rotary axis A.

8 Claims, 14 Drawing Sheets

ROTOR AND ROTATING MACHINE

TECHNICAL FIELD

The present invention relates to a rotor and a rotating machine.

BACKGROUND ART

Conventionally, a rotor including a rotor core that rotates around a rotary axis and a plurality of field windings held by the rotor core is known.

For example, a rotor described in Patent Literature 1 includes a cylindrical rotor core that rotates around a rotary axis and eight rotor windings held by the rotor core. The rotor core in the rotor includes eight salient poles, arranged at equal intervals in a circumferential direction, on an outer peripheral surface. Each of the eight salient poles protrudes outward in a radial direction around the rotary axis from the outer peripheral surface of the rotor core. The rotor winding as the field winding is wound around the outer peripheral surface of the salient pole.

SUMMARY OF INVENTION

Technical Problem

In this rotor, when the winding of the rotor winding around the salient pole is automated by a winding machine, it is necessary to use a high-performance winding machine, and thus there is a problem that cost increases. More specifically, for example, after the winding of the rotor winding around a first salient pole is completed, when the winding of the rotor winding around a second salient pole existing next to the first salient pole is performed, a bundle of the rotor winding wound around the first salient pole interferes with the winding operation of the rotor winding around the second salient pole. For this reason, it is necessary to use a high-performance winding machine capable of performing the winding operation even with a slight gap between the bundle of the rotor winding wound around the first salient pole and the bundle of the rotor winding gradually increasing in weight around the second salient pole as the winding around the second salient pole progresses.

In the rotor described in Patent Literature 1, in order to prevent collapse of the bundle of the rotor winding due to centrifugal force during rotation, it is necessary to mold the entire rotor with an insulator such as resin, and thus there is also a problem that cost increases.

The present invention has been made in view of the above background, and an object of the present invention is to provide a rotor and a rotating machine capable of avoiding an increase in cost due to use of a high-performance winding machine and an increase in cost due to molding of the entire rotor with an insulator.

Solution to Problem

One aspect of the present invention is a rotor including a rotor core that rotates around a rotary axis and a plurality of field windings held by the rotor core, the rotor including a plurality of winding units each including an iron core, the field winding wound around the iron core, and an insulating sealing body that seals the iron core and the field winding, in which the rotor core includes a plurality of unit accommodating portions that individually accommodate each of the plurality of winding units, and each of the plurality of unit accommodating portions extends in a rotary axis direction and is arranged in a circumferential direction around the rotary axis.

Another aspect of the present invention is a rotating machine including: a rotor that rotates around a rotary axis; a shaft that penetrates a center of the rotor; and a stator that surrounds the rotor in a circumferential direction around the rotary axis, in which the rotor is the rotor of one aspect of the present invention.

Advantageous Effects of Invention

According to the present invention, there is an excellent effect that it is possible to avoid an increase in cost due to use of a high-performance winding machine and an increase in cost due to molding of the entire rotor with an insulator.

DESCRIPTION OF EMBODIMENTS

Hereinafter, an embodiment of a motor as a rotating machine to which the present invention is applied will be described with reference to the drawings.

Figure 1:
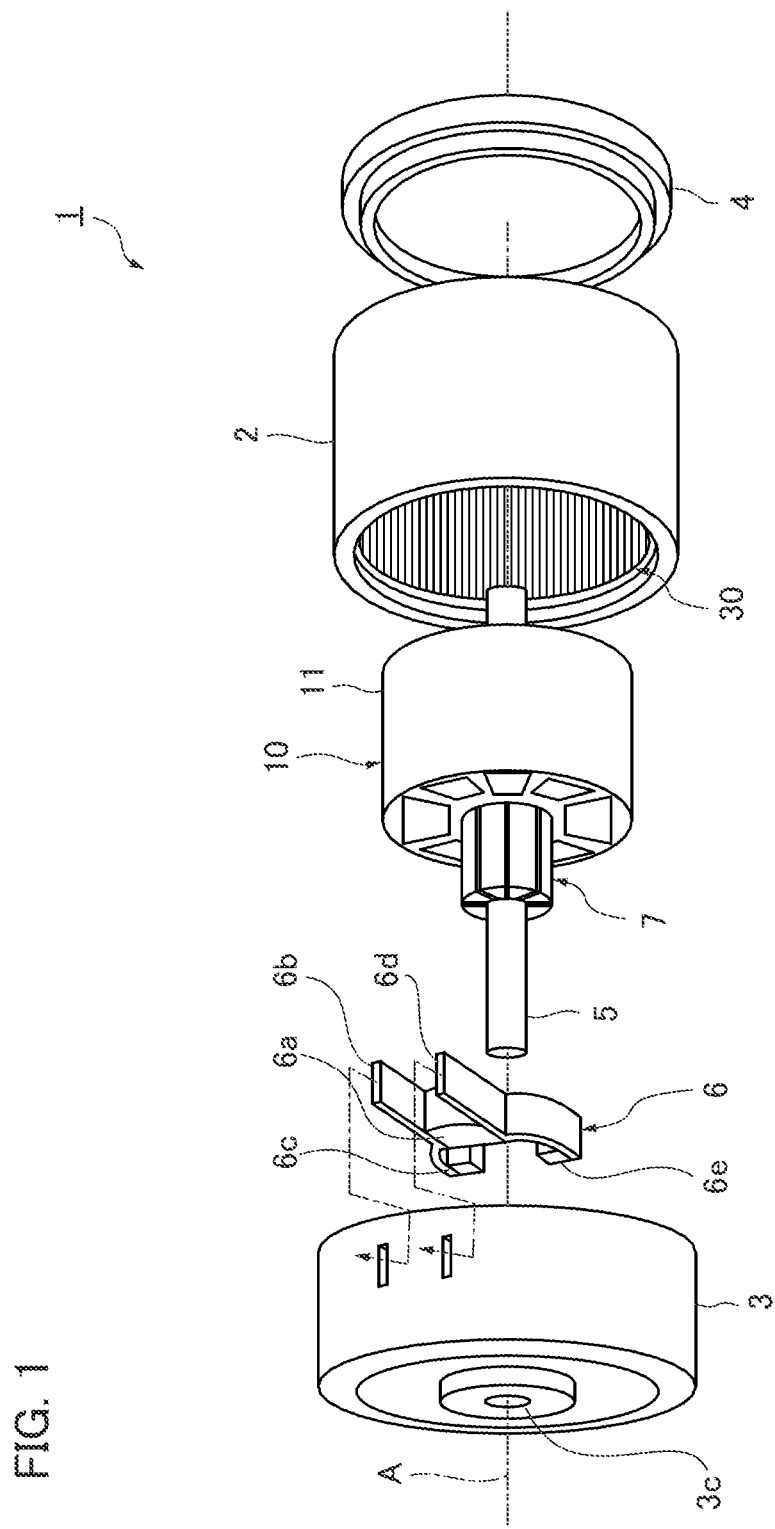
FIG. 1 is an exploded perspective view illustrating a motor according to an embodiment.

FIG. 1 is an exploded perspective view illustrating a motor 1 according to the embodiment. The motor 1 includes a cylindrical housing 2, a front cover 3, a rear cover 4, a shaft 5, a slip ring (brush) 6, a commutator 7, a rotor 10, and a stator 30.

The shaft 5 having a shaft shape penetrates the cylindrical commutator 7 and the cylindrical rotor 10 in a direction of a rotary axis A, and is located on the rotary axis A of the commutator 7 and the rotor 10. The shaft 5 rotates around the rotary axis A together with the commutator 7 and the rotor 10. The cylindrical housing 2 serves as a yoke and holds the cylindrical stator 30 on an inner peripheral surface. The housing 2 has openings at both ends in the direction of the rotary axis A. The rotor 10 is accommodated in a hollow of the stator 30 held on the inner peripheral surface of the housing 2. The bottomed cylindrical front cover 3 is connected to a front side of the housing 2 with the bottom facing the front side. With this connection, the front cover 3 accommodates the commutator 7 and the slip ring 6 inside in a state where the front side of the shaft 5 is made to penetrate a shaft hole 3c provided at a bottom portion and the opening on the front side of the housing 2 is closed.

The slip ring 6 includes an insulating base 6a, a metallic positive electrode terminal 6b, a conductive positive electrode contactor 6c, a metallic negative electrode terminal 6d, and a conductive negative electrode contactor 6e. The positive electrode terminal 6b and the negative electrode terminal 6d are fixed to the insulating base 6a while maintaining mutual insulation. The positive electrode contactor 6c is fixed to a rear end portion of the positive electrode terminal 6b. The negative electrode contactor 6e is fixed to a rear end portion of the negative electrode terminal 6d. The slip ring 6 is held by the front cover 3 in a state where the positive electrode contactor 6c and the negative electrode contactor 6e are brought into contact with an outer peripheral surface of the commutator 7. The commutator 7 includes eight contact portions arranged at equal intervals in a circumferential direction around the rotary axis A. The individual contact portions are insulated from each other.

The rear cover 4 is fixed to the housing 2 so as to close an opening of the housing 2 on a rear side.

Figure 2:
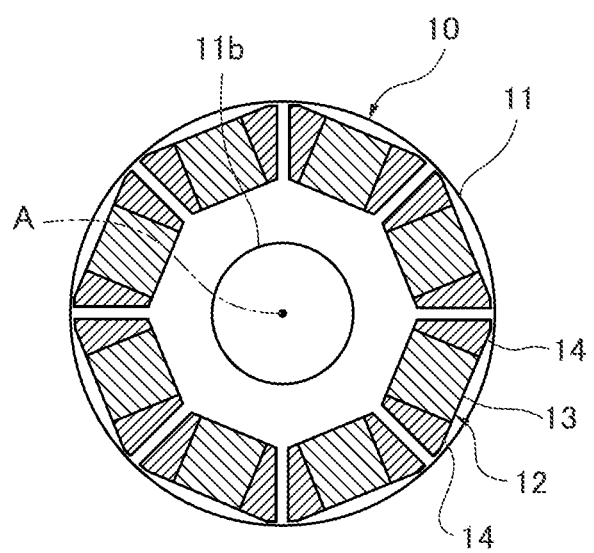
FIG. 2 is a cross-sectional view illustrating a cross section in a direction orthogonal to a rotary axis direction of a rotor of the motor.

FIG. 2 is a cross-sectional view illustrating a cross section in a direction orthogonal to the direction of the rotary axis A of the rotor 10. The rotor 10 includes a cylindrical rotor core 11 and eight winding units 12. Each of the eight winding units 12 includes an iron core 13 and a field winding 14 wound around the iron core 13, and is held by the rotor core 11 so as to be arranged at equal intervals in the circumferential direction around the rotary axis A. The rotor core 11 is formed into a columnar shape by stacking a plurality of metal plate pieces, which are obtained by punching a metal plate and include the shaft hole 11b in a central portion, in the direction of the rotary axis A. An insulating adhesive is interposed between the individual metal plate pieces constituting the rotor core 11, and the individual metal plates are insulated from each other. A shaft (5 in FIG. 1) penetrates the shaft hole 11b at the center of the rotor core 11.

Figure 3:
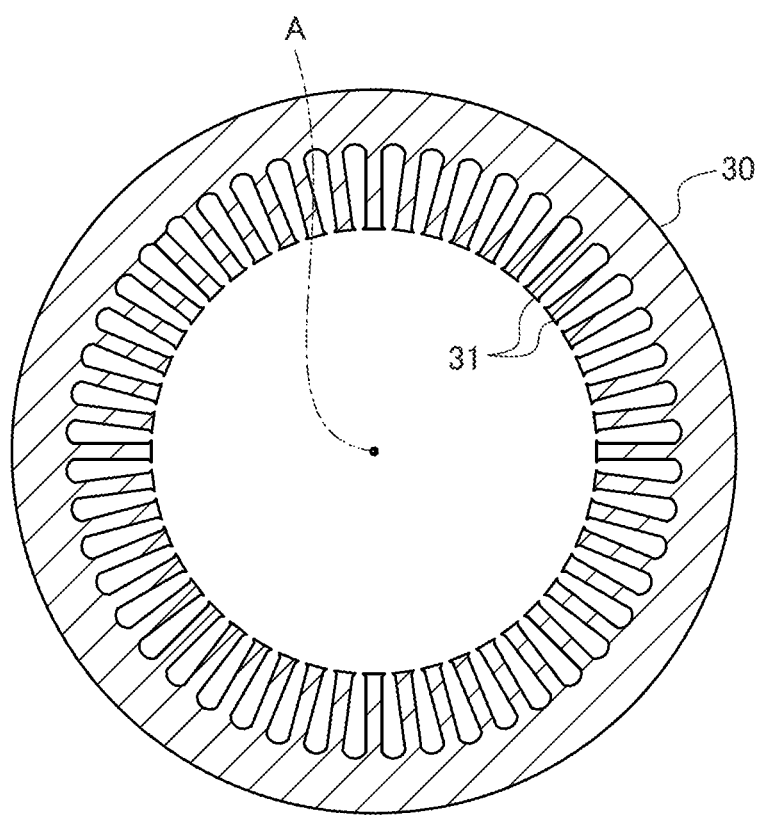
FIG. 3 is a cross-sectional view illustrating a cross section in a direction orthogonal to the rotary axis direction of a stator of the motor.

FIG. 3 is a cross-sectional view illustrating a cross section in a direction orthogonal to the direction of the rotary axis A of the stator 30. The cylindrical stator 30 includes a plurality of teeth 31 arranged at equal intervals in the circumferential direction around the rotary axis A on the inner peripheral surface. Each of the plurality of teeth 31 protrudes from the inner peripheral surface of the cylindrical stator 30 toward the rotary axis A.

Figure 4:
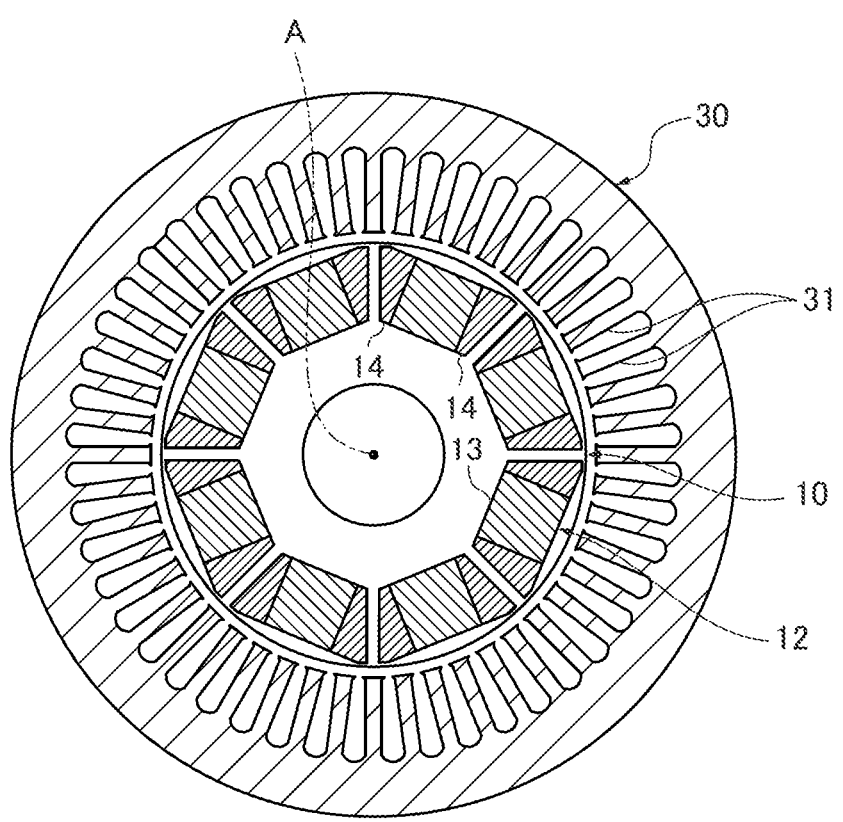
FIG. 4 is a cross-sectional view illustrating a cross section of the stator and the rotor accommodated in a hollow of the stator.

FIG. 4 is a cross-sectional view illustrating a cross section of the stator 30 and the rotor 10 accommodated in the hollow of the stator 30. The plurality of teeth 31 of the stator 30 surround the outer peripheral surface of the rotor 10. In the rotor 10, the eight winding units 12 are arranged in the circumferential direction at a radially outer end in the rotor core 11 around the rotary axis A. When a current flows through the field winding of the winding unit 12, a magnetic flux is generated around the winding unit 12, and the winding unit 12 is attracted by a magnetic force of the teeth 31 that do not face each other in the radial direction among the plurality of teeth 31. As a result, a circumferential torque is generated in the rotor 10, and the rotor 10 rotates together with the shaft (5 in FIG. 1) and the commutator (7 in FIG. 1).

Figure 5:
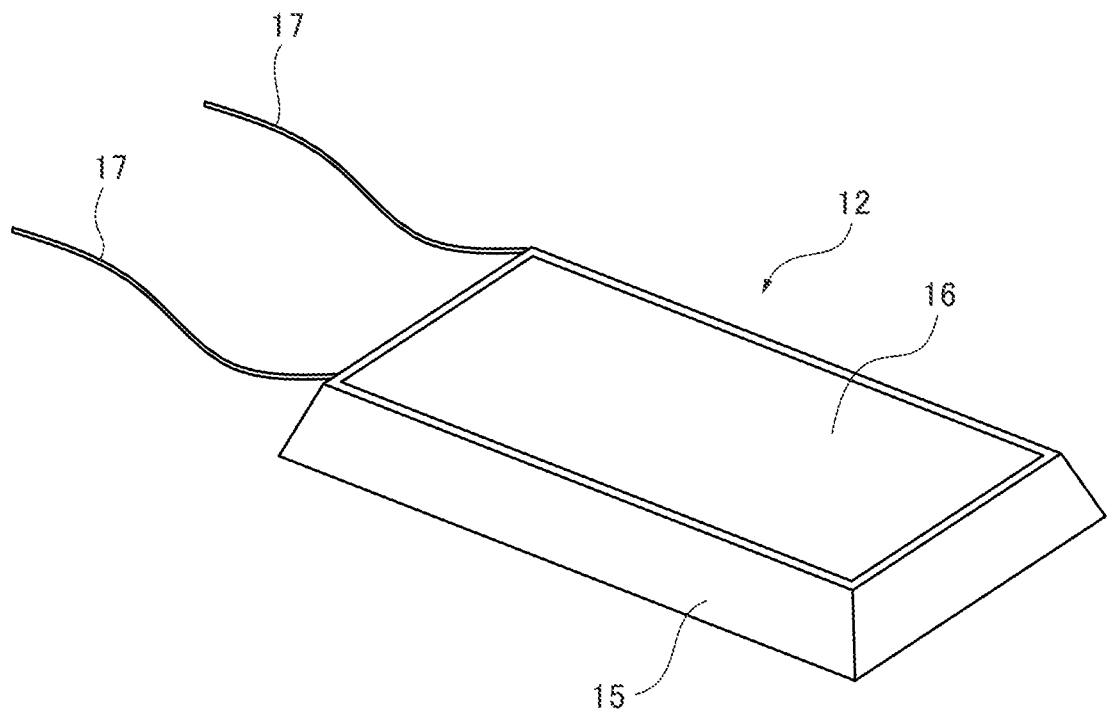
FIG. 5 is a perspective view illustrating a winding unit of the rotor.

FIG. 5 is a perspective view illustrating the winding unit 12. The winding unit 12 includes a resin case 15 having a box-like shape without a lid, and an insulating sealing resin 16 buried inside the case 15 for sealing.

Figure 6:
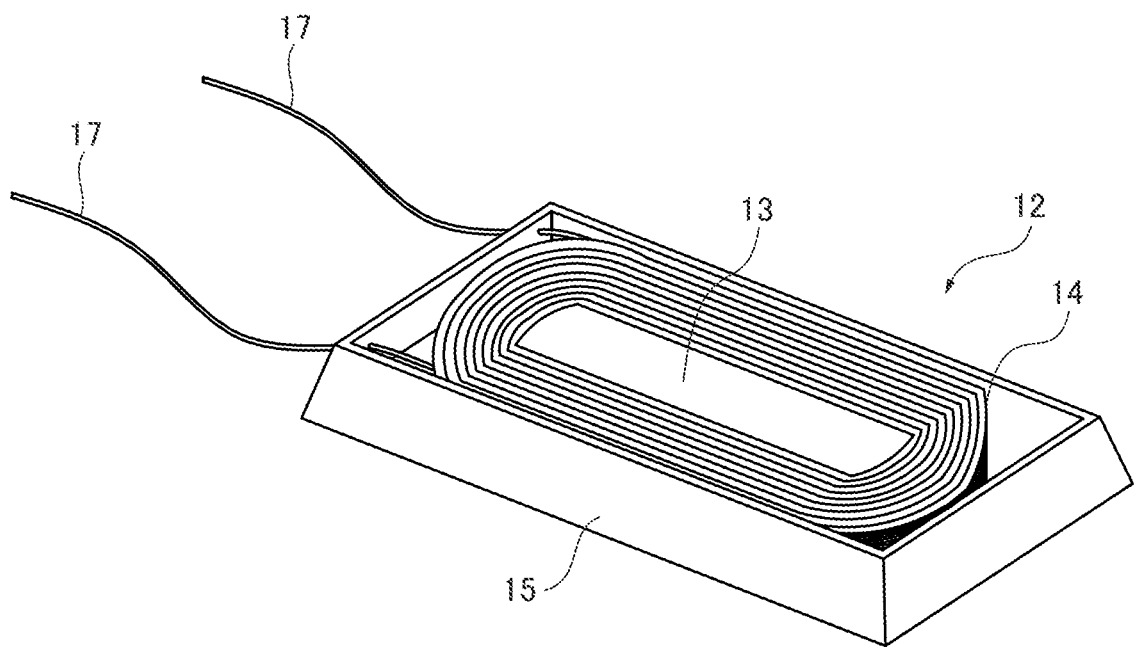
FIG. 6 is a perspective view illustrating the winding unit in a state before an inside of a case is filled with a sealing resin.

FIG. 6 is a perspective view illustrating the winding unit 12 in a state before the inside of the case 15 is filled with a sealing resin (16 in FIG. 5). The iron core 13 and the field winding 14 wound around the outer peripheral surface of the iron core 13 are accommodated in the case 15 before being filled with the sealing resin. A covered electric wire 17 is connected to each of both ends of the field winding 14, and is extended to an outside of the case 15. When a sealing resin as a sealing body is poured into the case 15 illustrated in FIG. 6 and cured, the iron core 13 and the field winding 14 are sealed in the case 15 by the sealing resin. The covered electric wire 17 is connected to the contact portion of the commutator (7 in FIG. 1).

Figure 7:
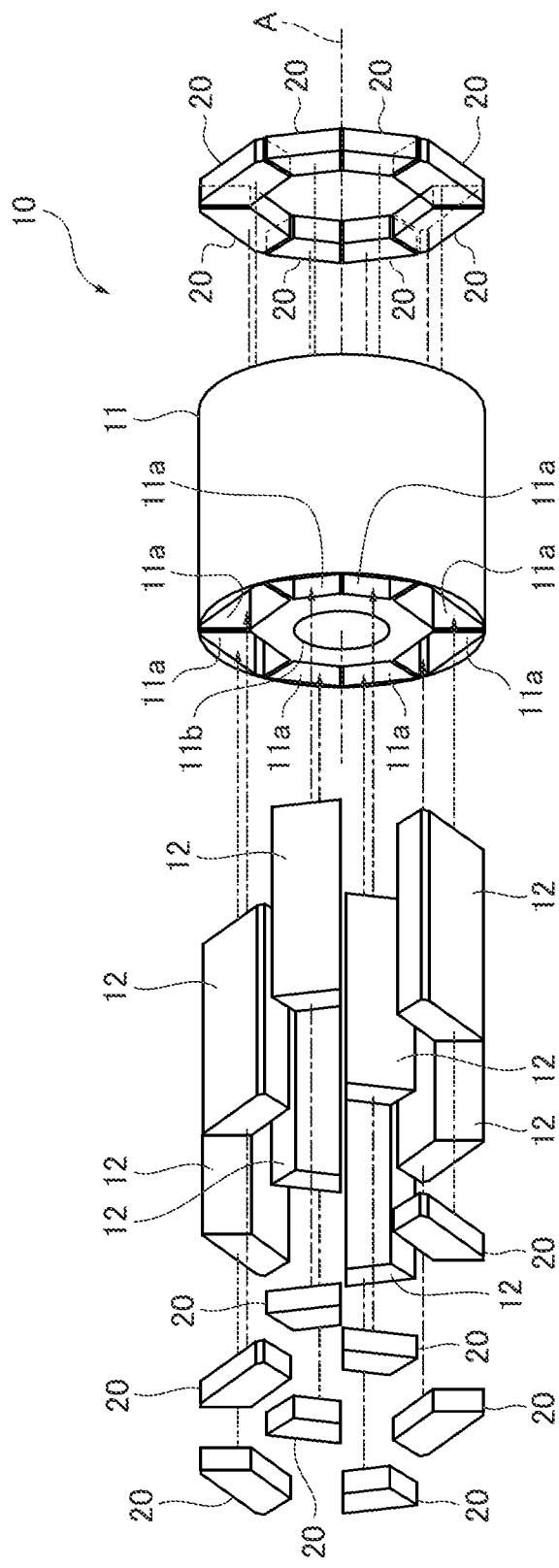
FIG. 7 is an exploded perspective view illustrating the rotor.

FIG. 7 is an exploded perspective view illustrating the rotor 10. The rotor core 11 of the rotor 10 includes eight unit through holes 11a as unit accommodating portions that individually accommodate each of the eight winding units 12. Each of the eight unit through holes 11a extends in the direction of the rotary axis A and is arranged at equal intervals in the circumferential direction around the rotary axis A. The winding unit 12 is inserted and accommodated in each of the eight unit through holes 11a in the direction of the rotary axis A, and extends in the direction of the rotary axis A.

Each of the eight unit through holes 11a has openings at both ends in the direction of the rotary axis A. Each of the openings at both ends of the unit through hole 11a accommodating the winding unit 12 is closed by fitting of a closing member 20. The closing member 20 fitted into the opening presses the winding unit 12, accommodated in the unit through hole 11a, toward the center of the unit through hole 11a in the direction of the rotary axis A. By this pressing, the winding unit 12 is locked at a predetermined position in the direction of the rotary axis A in the unit through hole 11a.

The field winding 14 illustrated in FIG. 6 is wound around the iron core 13 by a winding machine before being accommodated in the case 15, and is accommodated in the case 15 together with the iron core 13. When the field winding 14 is wound around the iron core 13, there is no obstacle to the winding operation by the winding machine around either the iron core 13 or the field winding 14. Thus, it is not necessary to use a high-performance winding machine capable of performing winding with a very small gap, and it is possible to use a general winding machine. Therefore, according to the motor 1 according to the embodiment, it is possible to avoid an increase in cost due to the use of the high-performance winding machine.

In the motor 1 according to the embodiment, since the field winding 14 is sealed with the sealing resin (16 in FIG. 5) in the winding unit 12, even if centrifugal force during rotation acts, a bundle of the field winding 14 is not collapsed. Thus, it is possible to prevent collapse of the bundle of the field winding 14 without molding the entire rotor 10 with an insulator such as resin using large-scale molding equipment. Thus, according to the motor 1 according to the embodiment, it is possible to prevent collapse of the bundle of the field winding 14 due to the action of the centrifugal force during rotation while avoiding the cost increase caused by molding the entire rotor 10 with an insulator such as resin.

In the motor 1 according to the embodiment, since the field winding 14 can be easily wound around the iron core 13, winding with high density can be performed. In addition to being able to wind a round wire as an electric wire around the iron core 13 at high density, it is also possible to wind a rectangular wire as an electric wire around the iron core 13 at high density. When the round wire is used, many voids are formed in the bundle of the field winding 14, and therefore, an occupancy of the electric wire per unit volume is at most slightly under 60 [%], whereas when the rectangular wire is used, the occupancy of the electric wire can be set to 60 [%] or more. By increasing the occupancy of the electric wire, a torque of the motor 1 can be increased.

Although the example in which the unit through hole 11a is provided as the unit accommodating portion in the rotor core 11 has been described, a unit recess extending in the direction of the rotary axis A may be provided as the unit accommodating portion instead of the unit through hole 11a. Since the unit recess has an opening only at one end of both ends in the direction of the rotary axis A, only the opening at one end may be closed by the closing member 20. In this case, in order to balance weight at both ends in the direction of the rotary axis A in the rotor 10, it is desirable to use a metal member as the closing member 20. In the configuration in which the unit recess is provided as the unit accommodating portion in the rotor core 11, the number of the closing members 20 can be reduced to achieve cost reduction, and the number of steps in the process of fitting the closing member 20 into the opening can be reduced to improve productivity.

Although the example of the motor 1 having the configuration in which eight poles of the field magnet system are provided with respect to the rotor 10 has been described, the number of poles of the field magnet system is not limited to eight poles.

Although the example in which the present invention is applied to the motor 1 as a rotating machine has been described, the present invention can also be applied to a generator (dynamo) as the rotating machine.

Next, each example in which a more characteristic configuration is added to the motor 1 according to the embodiment will be described. The configuration of the motor 1 according to each example is the same as that of the embodiment unless otherwise noted.

First Example

Figure 8:
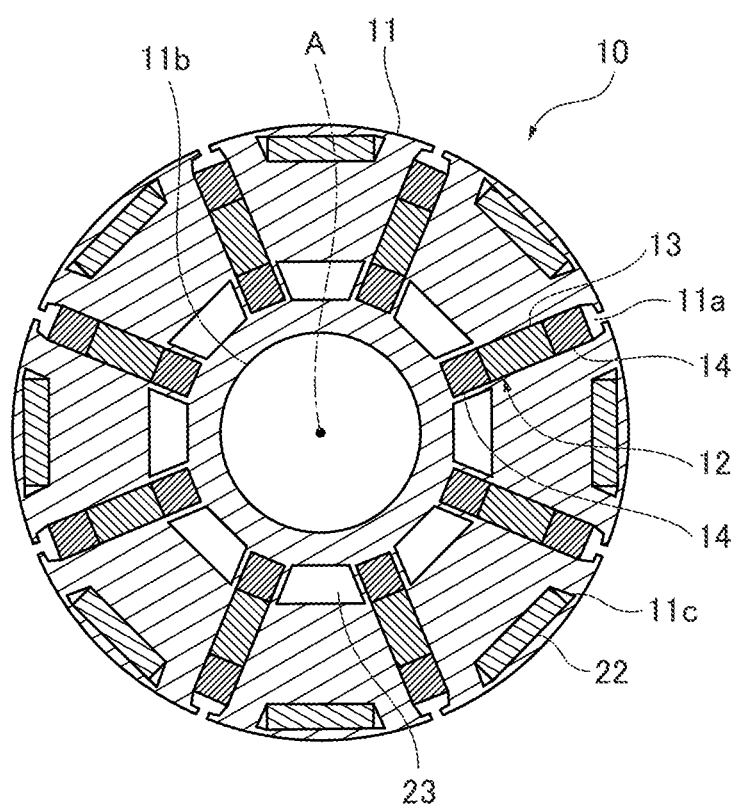
FIG. 8 is a cross-sectional view illustrating a cross section of the rotor of the motor according to a first example.
Figure 9:
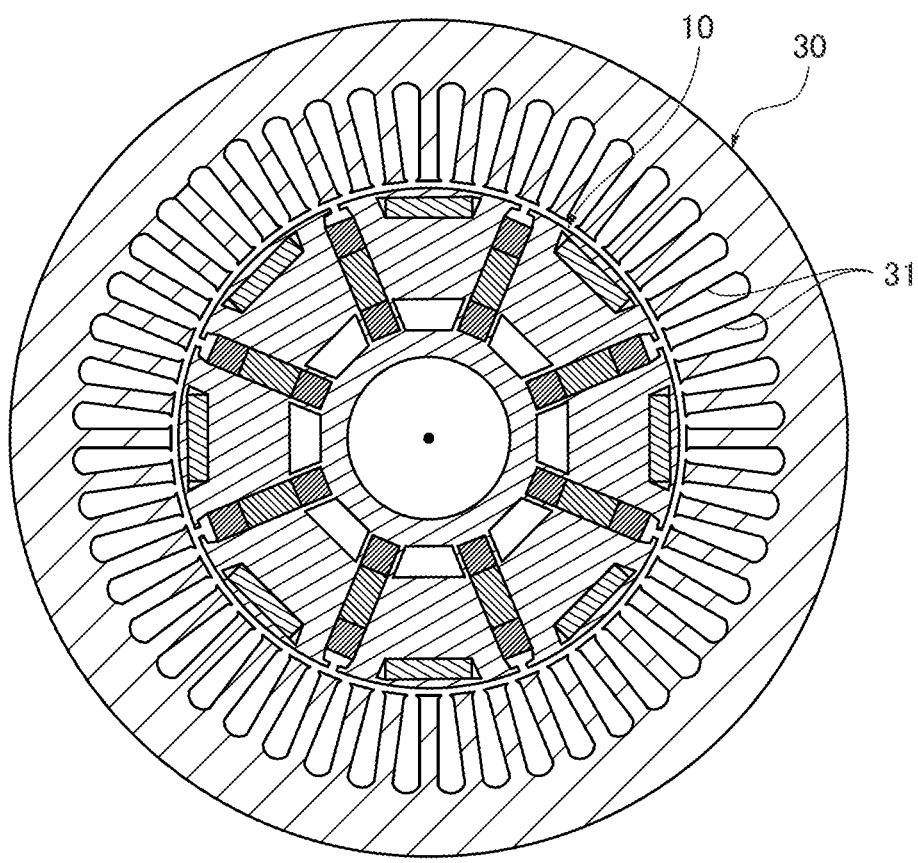
FIG. 9 is a cross-sectional view illustrating a cross section of the stator of the motor and the rotor.

FIG. 8 is a cross-sectional view illustrating a cross section of the rotor 10 of the motor 1 according to a first example. FIG. 9 is a cross-sectional view illustrating a cross section of the stator 30 of the motor 1 according to the first example and the rotor 10 accommodated in the hollow of the stator 30. In the rotor 10 of the motor 1 according to the first example, the eight unit through holes 11a arranged at equal intervals in the circumferential direction are arranged in a posture in which a longitudinal direction of the opening is along the radial direction. Each of the eight winding units 12 is accommodated in the unit through hole 11a in a radial posture in which the longitudinal direction of the cross section is along the radial direction and the rotary axis A is the center.

Eight magnet through holes 11c are provided at an outer edge of the rotor core 11 in the cross section. Each of the eight magnet through holes 11c extends in the direction of the rotary axis A and is disposed between the two winding units 12 adjacent to each other in the circumferential direction. Furthermore, each of the eight magnet through holes 11c is disposed in a posture in which the longitudinal direction of the opening is along a direction parallel to a tangent to an outer periphery of the rotor core 11.

In the rotor core 11, eight cavities 23 are provided in a region on the rotary axis A side in the radial direction around the rotary axis A. Each of the eight cavities 23 is disposed between the two winding units 12 adjacent to each other, and plays a role of suppressing that a magnetic flux extending from the winding unit 12 reaches a shaft (5 in FIG. 1).

In the rotor 10 of the motor 1 according to the first example, high torque and high rotation can be achieved by using a magnetic force generated from a permanent magnet 22 as a rotational torque.

In FIG. 9, the stator 30 includes the 48 teeth 31 arranged in the circumferential direction. Each of the 48 teeth 31 is classified into one of the teeth 31 for a U phase, the teeth 31 for a V phase, and the teeth 31 for a W phase in a three-phase AC power supply. Although not illustrated in FIG. 9 for convenience, a U-phase coil is wound around the U-phase teeth 31, and a U-phase voltage in a three-phase power supply is applied to the U-phase coil. A V-phase coil is wound around the V-phase teeth 31, and a V-phase voltage in the three-phase power supply is applied to the V-phase coil. A W-phase coil is wound around the W-phase teeth 31, and a W-phase voltage in the three-phase power supply is applied to the W-phase coil. The 48 teeth 31 are repeatedly arranged in the order of the U-phase teeth 31, the V-phase teeth 31, and the W-phase teeth 31 in a clockwise direction in the circumferential direction. The arrangement order of the teeth 31 of each phase is not limited to the above-described arrangement order. Any order may be employed as long as the respective phases are repeatedly arranged in a predetermined order.

Figure 10:
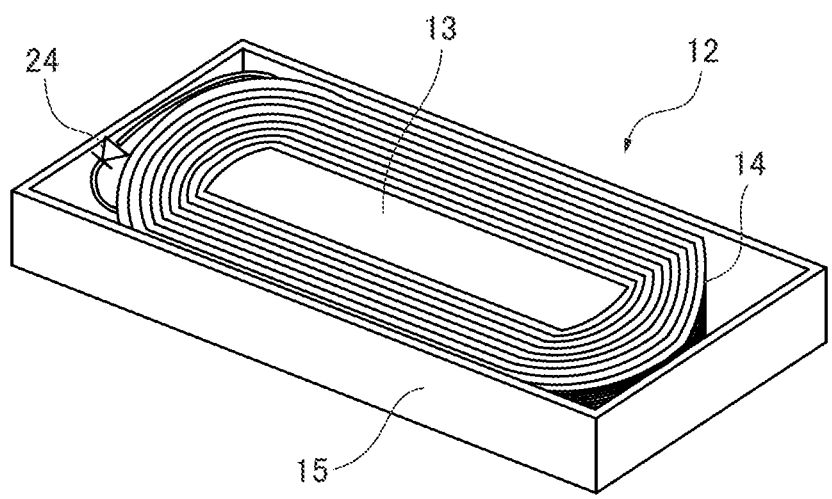
FIG. 10 is a perspective view illustrating the winding unit in a state before the inside of the case in the rotor is filled with the sealing resin.

FIG. 10 is a perspective view illustrating the winding unit 12 in a state before the inside of the case 15 in the rotor 10 of the motor 1 according to the first example is filled with a sealing resin (16 in FIG. 5). The both ends of the field winding 14 wound around the iron core 13 are connected via a diode 24.

In FIG. 9, among the eight winding units 12, pairs of the winding units 12 adjacent to each other are arranged in a posture in which directions of diodes (24 in FIG. 10) inside the pairs are opposite to each other. Space harmonics are generated in a space between the rotor 10 and the stator 30. When the space harmonics and harmonics flowing in the coil wound around the teeth 31 of the stator 30 are superimposed, an induced current in one direction is generated in the field winding 14 illustrated in FIG. 10. That is, in the motor 1 according to the first example, even if an external power supply is not electrically connected to the field winding 14 of the rotor 10, a current can be caused to flow through the field winding 14 to generate a magnetic flux around the winding unit 12. Thus, in the motor 1 according to the first example, the slip ring (6 in FIG. 1) and the commutator (7 in FIG. 1) for electrically connecting the external power supply to the field winding 14 are not provided.

Therefore, according to the motor 1 according to the first example, it is possible to avoid a decrease in the life of the motor 1 due to wear of the slip ring and the commutator. In the motor described in Patent Literature 1, it is necessary to connect the diode to the rotor winding wound around the salient pole of the rotor, and the shape of the rotor is complicated; therefore, there is a problem that it takes time and effort to connect the diode. On the other hand, according to the motor 1 according to the first example, since the diode can be connected to simple structures such as the iron core and the field winding wound around the iron core, the diode connection operation can be facilitated to enhance the productivity.

In the motor 1 according to the first example, since an inter-terminal voltage increases at the time of high-speed rotation, when field weakening control for suppressing an amount of magnetic flux of the rotor 10 is performed, it is possible to reduce the amount of magnetic flux interlinked to the rotor 10 by eliminating high frequency waves superimposed on the field winding of the rotor 10. Thus, according to the motor 1 according to the first example, a reactive current required for the field weakening control can be reduced.

Also in the motor 1 according to the second, third, and fourth examples to be described later, the both ends of the field winding 14 are connected via the diode 24, and the same effects as those of the motor 1 according to the first example can be obtained.

Second Example

Figure 11:
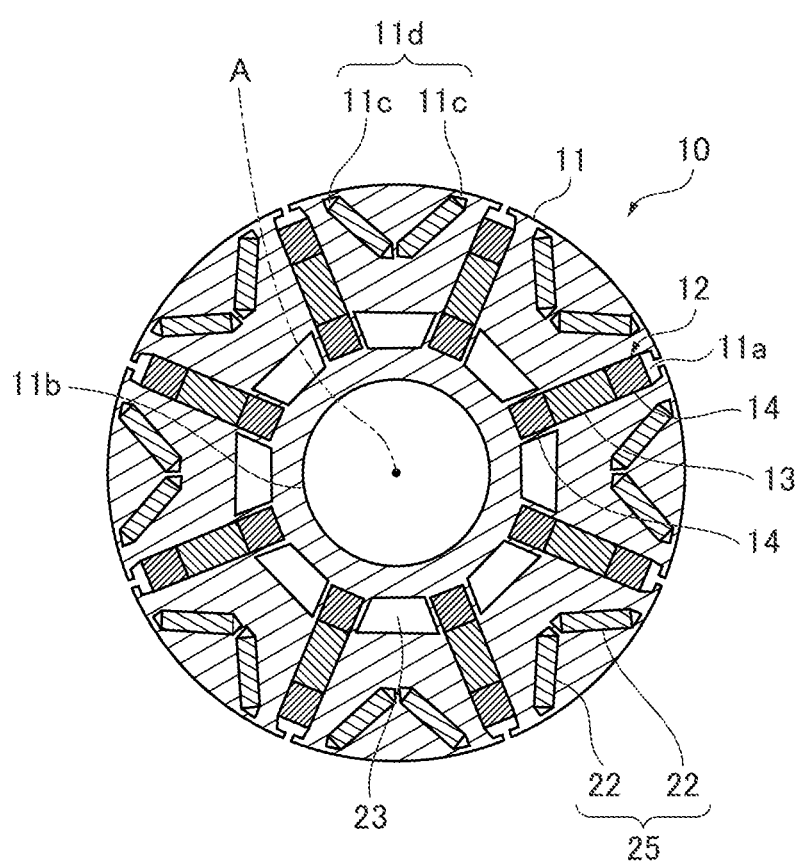
FIG. 11 is a cross-sectional view illustrating a cross section of the rotor of the motor according to a second example.

FIG. 11 is a cross-sectional view illustrating a cross section of the rotor 10 of the motor 1 according to a second example. The rotor 10 of the motor 1 according to the second example includes eight pairs of magnet through holes 11*d*, including a pair of the magnet through holes 11*c*, as the plurality of magnet through holes 11*c*. The pair of magnet through holes 11 *c* in each of the eight pairs of magnet through holes 11*d* as a pair of magnet accommodating portions is disposed such that the longitudinal directions of the openings of the pair are along a V shape that opens outward in the radial direction around the rotary axis A.

The rotor 10 includes, as a plurality of the permanent magnets 22, eight magnet pairs 25 each including a pair of the permanent magnets 22. The pair of permanent magnets 22 in each of the eight magnet pairs 25 is accommodated in the magnet through hole 11*c* in a posture in which the longitudinal directions of the cross sections thereof are along the V shape.

Each of the eight unit through holes 11*a* is disposed such that the longitudinal directions of the respective openings are along the radial direction. Each of the eight winding units 12 is accommodated in the unit through hole 11*a* in a posture in which each cross sections is along the radial direction.

In the motor 1 having such a configuration, since the pair of permanent magnets 22 of the magnet pair 25 is disposed in the posture along the V shape as described above, as compared with the motor 1 according to the first example, a density of the magnetic flux extending from the permanent magnet 22 can be increased, and higher torque can be exerted. On the other hand, in the motor 1 according to the first example, the number of the permanent magnets 22 is reduced (halved) as compared with the motor 1 according to the second example, so that the number of steps in the process of inserting the permanent magnet 22 into the magnet through hole 11*c* is reduced, and the cost can be reduced.

Third Example

Figure 12:
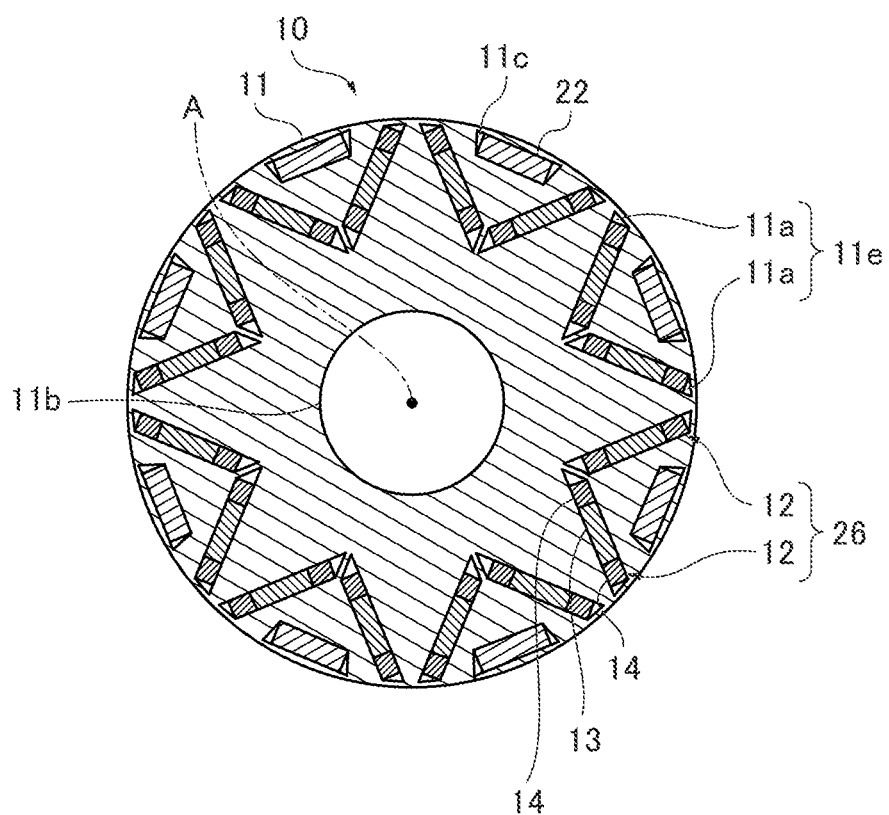
FIG. 12 is a cross-sectional view illustrating a cross section of the rotor of the motor according to a third example.

FIG. 12 is a cross-sectional view illustrating a cross section of the rotor 10 of the motor 1 according to a third example. The rotor 10 of the motor 1 according to the third example includes eight pairs of unit through holes 11*e*, including a pair of the unit through holes 11*a*, as the plurality of unit through holes 11*a* . The rotor 10 includes eight unit pairs 26, each including a pair of the winding units 12, as the plurality of winding units 12.

The pair of unit through holes 11*a* in each of the eight pairs of unit through holes 11*e* as a pair of unit accommodating portions is disposed such that the longitudinal directions of the openings of the pair are along the V shape that opens outward in the radial direction around the rotary axis A. The pair of winding units 12 in each of the eight unit pairs 26 is accommodated in the unit through hole 11*a* in a posture along a V shape in which the longitudinal directions of the cross sections of the winding units are along the V shape that opens outward in the radial direction.

In the motor 1 having such a configuration, since the pair of winding units 12 of the unit pair 26 is disposed in the posture along the V shape as described above, as compared with the motor 1 according to the first example, the density of the magnetic flux extending from the winding unit 12 can be increased, and higher torque can be exerted. On the other hand, in the motor 1 according to the first example, the number of the winding units 12 is reduced (halved) as compared with the motor 1 according to the third example, so that the number of steps in the process of inserting the winding unit 12 into the unit through hole 11*a* is reduced, and the cost can be reduced.

Fourth Example

The motor 1 according to the fourth example has the same configuration as the motor 1 according to the third example except for the points described below.

Figure 13:
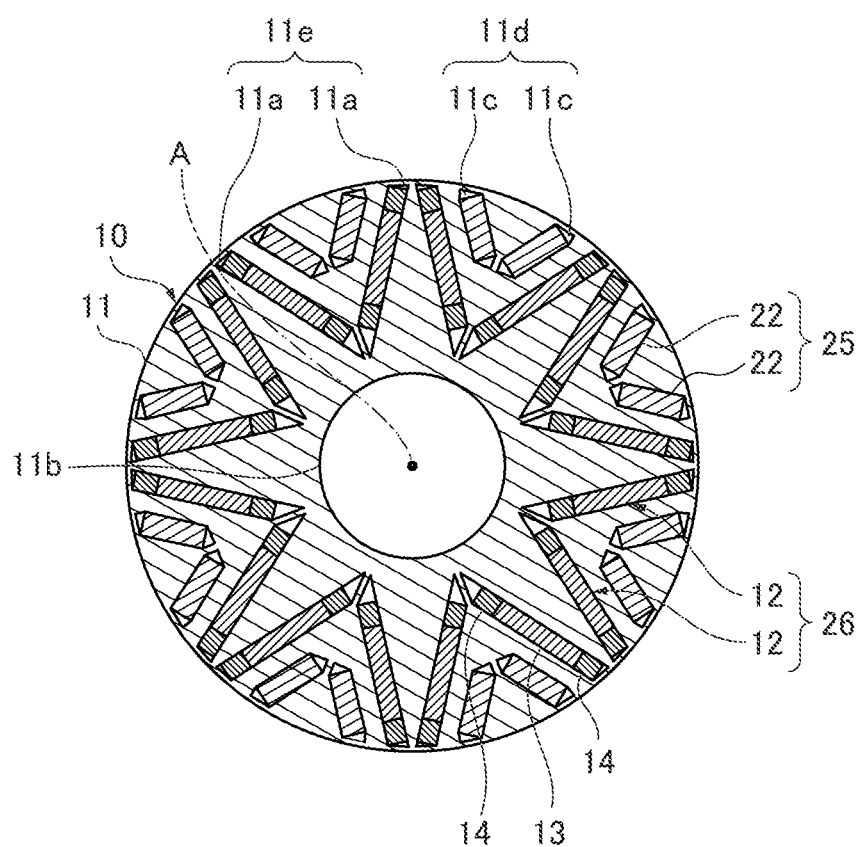
FIG. 13 is a cross-sectional view illustrating a cross section of the rotor of the motor according to a fourth example.

FIG. 13 is a cross-sectional view illustrating a cross section of the rotor 10 of the motor 1 according to the fourth example. The rotor 10 of the motor 1 according to the fourth example includes the eight pairs of magnet through holes 11*d*, including the pair of magnet through holes 11*c*, as the plurality of magnet through holes 11*c*. The rotor 10 includes, as the plurality of permanent magnets 22, the eight magnet pairs 25 each including the pair of permanent magnets 22.

The pair of magnet through holes 11*c* in each of the eight pairs of magnet through holes 11*d* is disposed such that the longitudinal directions of the openings of the pair are along the V shape that opens outward in the radial direction. The pair of permanent magnets 22 in each of the eight magnet pairs 25 is accommodated in the magnet through hole 11*c* in a posture in which the longitudinal directions of the cross sections thereof are along the V shape that opens outward in the radial direction.

In the motor 1 having such a configuration, since the pair of permanent magnets 22 of the magnet pair 25 is disposed in the posture along the V shape as described above, as compared with the motor 1 according to the third example, the density of the magnetic flux extending from the permanent magnet 22 can be increased, and higher torque can be exerted. On the other hand, in the motor 1 according to the third example, the number of the permanent magnets 22 is reduced (halved) as compared with the motor 1 according to the fourth example, so that the number of steps in the process of inserting the permanent magnet 22 into the magnet through hole 11*c* is reduced, and the cost can be reduced.

Fifth Example

Figure 14:
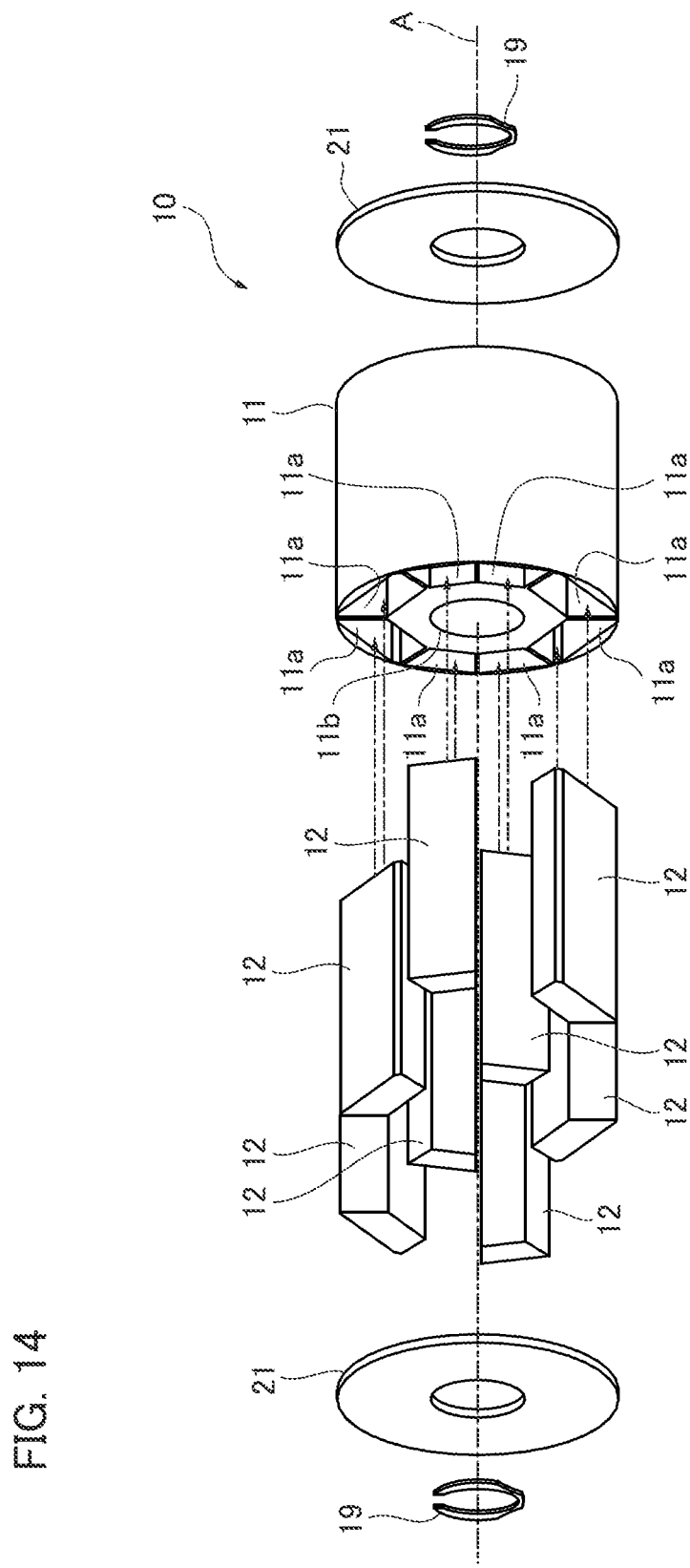
FIG. 14 is an exploded perspective view illustrating the rotor of the motor according to a fifth example.

FIG. 14 is an exploded perspective view illustrating the rotor 10 of the motor 1 according to a fifth example. In the rotor 10, a length in the direction of the rotary axis A in each of the eight winding units 12 is the same as a length in the direction of the rotary axis A in the rotor core 11. The openings of the eight unit through holes 11a provided in an end face on one side (left side in the drawing) in the direction of the rotary axis A of the rotor core 11 are commonly closed by a closing plate 21 as a closing member. That is, the closing plate 21 integrally closes the openings of the eight unit through holes 11a. A diameter of the closing plate 21 is the same as or slightly smaller than a diameter of the rotor core 11. A shaft hole for allowing a shaft (5 in FIG. 1) to penetrate is provided at a radial center portion of the closing plate 21. The closing plate 21 is pressed toward one end face in the direction of the rotary axis A of the rotor core 11 by a C ring 19 fitted into a groove provided in the shaft. The openings of the eight unit through holes 11a provided on the other side in the direction of the rotary axis A of the rotor core 11 are also commonly closed by the closing plate 21 similarly to the one side in the direction of the rotary axis A.

In such a configuration, since the process of closing each opening of the eight unit through holes 11a is only one process, it is possible to reduce the number of steps and enhance the productivity as compared with an aspect of individually closing each opening.

The present invention is not limited to the above-described embodiment and each example, and a configuration different from the embodiment and each example can be adopted within a range where the configuration of the present invention can be applied. The present invention has unique effects for each aspect described below.

First Aspect

A first aspect is a rotor (for example, rotor 10) including a rotor core (for example, rotor core 11) that rotates around a rotary axis (for example, rotary axis A) and a plurality of field windings held by the rotor core (for example, field winding 14), the rotor including a plurality of winding units (for example, winding unit 12) each including an iron core (for example, iron core 13), the field winding wound around the iron core, and an insulating sealing body (for example, sealing resin 16) that seals the iron core and the field winding, in which the rotor core includes a plurality of unit accommodating portions (for example, unit through hole 11a) that individually accommodate each of the plurality of winding units, and each of the plurality of unit accommodating portions extends in a rotary axis direction and is arranged in a circumferential direction around the rotary axis.

In such a configuration, when the field winding is wound around the iron core in order to manufacture the winding unit separate from the rotor core, there is no obstacle to winding operation by a winding machine around either the iron core or the field winding. Thus, it is not necessary to use a high-performance winding machine capable of performing winding with a very small gap, and it is possible to use a general winding machine. Thus, according to first aspect, it is possible to avoid an increase in cost due to the use of the high-performance winding machine.

In the winding unit of the first aspect, since the field winding is sealed with the insulating sealing body, even if the centrifugal force during rotation acts, the bundle of the field winding is not collapsed. Thus, it is possible to prevent collapse of the bundle of the field winding without molding the entire rotor with an insulator such as resin using large-scale molding equipment. Thus, according to the first aspect, it is possible to prevent collapse of the bundle of the field winding due to the action of the centrifugal force during rotation while avoiding the cost increase caused by molding the entire rotor with an insulator such as resin.

In the first aspect, since the field winding can be easily wound around the iron core, winding with high density can be performed. For example, in addition to being able to wind a round wire as an electric wire around the iron core at high density, it is also possible to wind a rectangular wire as an electric wire around the iron core at high density. Thus, the torque of the motor can be increased.

Second Aspect

A second aspect is a rotor including the configuration of the first aspect and including a closing member (for example, the closing member 20) that closes an opening at an end in the rotary axis direction in each of the plurality of unit accommodating portions.

According to such a configuration, the winding unit can be locked at a predetermined position in the rotary axis direction in the unit accommodating portion.

Third Aspect

A third aspect is a rotor including: the configuration of the first aspect or the second aspect; and a plurality of permanent magnets (for example, permanent magnets 22), in which the rotor core includes a plurality of magnet accommodating portions (for example, magnet through holes 11c) that individually accommodate each of the plurality of permanent magnets, each of the plurality of magnet accommodating portions extends in the rotary axis direction and is arranged in a circumferential direction around the rotary axis, and both ends of the field winding in each of the plurality of winding units are electrically connected via a diode (for example, diode 24).

In such a configuration, even if an external power supply is not electrically connected to the field winding of the rotor, it is possible to cause a current to flow through the field winding to form a magnetic flux around the winding unit, and therefore, a slip ring and a commutator for electrically connecting the external power supply to the field winding 14 are unnecessary. Thus, according to the third aspect, it is possible to avoid a decrease in the life of the motor 1 due to wear of the slip ring and the commutator.

Fourth Aspect

A fourth aspect is a rotor including the configuration of the third aspect, in which each of the plurality of unit accommodating portions is disposed in a posture in which a longitudinal direction of an opening is along a radial direction around the rotary axis, each of the plurality of winding units is accommodated in the unit accommodating portion in a posture in which a longitudinal direction of a cross section is along the radial direction, each of the plurality of magnet accommodating portions is disposed such that the longitudinal direction of the opening is along a direction parallel to a tangent to an outer periphery of the rotor core, and each of the plurality of permanent magnets is accommodated in the magnet accommodating portion in a posture in which the longitudinal direction of the cross section is along the direction parallel to the tangent.

According to such a configuration, high torque and high rotation can be achieved by using a magnetic force generated from the permanent magnet as a rotational torque. According to the fourth aspect, when the number of poles of the rotor is the same, the number of permanent magnets is reduced as compared with the fifth aspect to be described later, so that the number of steps in the process of inserting the permanent magnet into the magnet accommodating portion is reduced, and the cost can be reduced.

Fifth Aspect

A fifth aspect includes the configuration of the third aspect, and is a rotor in which a plurality of magnet accommodating portion pairs (for example, magnet through hole pairs 11d) each including a pair of the magnet accommodating portions are provided as the plurality of magnet accommodating portions, a plurality of magnet pairs (for example, magnet pairs 25) each including a pair of the permanent magnets are provided as the plurality of permanent magnets, the pair of magnet accommodating portions in each of the plurality of magnet accommodating portion pairs is disposed such that a longitudinal direction of each opening is along a V shape that opens outward in a radial direction around a rotary axis, the pair of permanent magnets in each of the plurality of magnet pairs is accommodated in the magnet accommodating portion in a posture in which a longitudinal direction of each cross section is along the V shape, each of the plurality of unit accommodating portions is disposed such that the longitudinal direction of each opening is along the radial direction, and each of the plurality of winding units is accommodated in the unit accommodating portion in a posture in which each cross section is along the radial direction.

According to such a configuration, since the pair of permanent magnets of the magnet pair is disposed in the posture along the V shape as described above, as compared with the fourth aspect, the density of the magnetic flux extending from the permanent magnet can be increased, and higher torque can be exerted.

Sixth Aspect

A sixth aspect includes the configuration of the third aspect, and is a rotor in which a plurality of unit accommodating portion pairs (for example, unit through hole pairs 11e) each including a pair of the unit accommodating portions are provided as the plurality of unit accommodating portions, a plurality of unit pairs (for example, unit pairs 26) each including a pair of the winding units are provided as the plurality of winding units, the pair of unit accommodating portions in each of the plurality of unit accommodating portion pairs is disposed such that a longitudinal direction of each opening is along a V shape that opens outward in a radial direction around a rotary axis, and the pair of winding units in each of the plurality of unit pairs is accommodated in the unit accommodating portion in a posture in which a longitudinal direction of each cross section is along the V shape that opens outward in the radial direction.

According to such a configuration, since the pair of winding units of the unit pair is disposed in the posture along the V shape as described above, as compared with the fourth aspect, the density of the magnetic flux extending from the winding unit can be increased, and higher torque can be exerted.

Seventh Aspect

A seventh aspect includes the configuration of the sixth aspect, and is a rotor in which a plurality of magnet accommodating portion pairs each including a pair of the magnet accommodating portions are provided as the plurality of magnet accommodating portions, a plurality of magnet pairs each including a pair of the permanent magnets are provided as the plurality of permanent magnets, the pair of magnet accommodating portions in each of the plurality of magnet accommodating portion pairs is disposed such that a longitudinal direction of each opening is along a V shape that opens outward in the radial direction, and the pair of permanent magnets in each of the plurality of magnet pairs is accommodated in the magnet accommodating portion in a posture in which a longitudinal direction of each cross section is along the V shape that opens outward in the radial direction.

According to such a configuration, since the pair of permanent magnets of the magnet pair is disposed in the posture along the V shape as described above, as compared with the sixth aspect, the density of the magnetic flux extending from the permanent magnet can be increased, and higher torque can be exerted.

Eighth Aspect

An eighth aspect includes any one of the first to seventh aspects, and is a rotating machine including: a rotor that rotates around a rotary axis; a shaft (for example, shaft 5) that penetrates a center of the rotor; and a stator (for example, stator 30) that surrounds the rotor in a circumferential direction around the rotary axis, in which the rotor is the rotor according to any one of the first to seventh aspects.

According to such a configuration, it is possible to avoid an increase in cost due to use of a high-performance winding machine and an increase in cost due to molding of the entire rotor with an insulator.

This application claims priority based on Japanese Patent Application No. 2019-170825 filed on Sep. 19, 2019, the content disclosed in the aforementioned Japanese patent application being incorporated by reference herein in its entirety.

Industrial Applicability

The present invention is applicable to a rotating machine such as a motor and a generator.

Reference Signs List

A rotary axis
1 motor (rotating machine)
2 housing
3 front cover
4 rear cover
5 shaft
6 slip ring
7 commutator
10 rotor
11 rotor core
11a unit through hole
11b shaft hole
11c magnet through hole
11d magnet through hole pair
11e unit through hole pair
12 winding unit
13 iron core
14 field winding
15 case
16 sealing resin (sealing body)
20 closing member 24 diode
25 magnet pair
26 unit pair
30 stator
31 teeth

The invention claimed is:

1. A rotor including a rotor core configured to rotate around a rotary axis and a plurality of field windings held by the rotor core, the rotor comprising a plurality of winding units each including an iron core, the field winding wound around the iron core, and an insulating sealing body configured to seal the iron core and the field winding, wherein the rotor core includes a plurality of unit accommodating portions configured to individually accommodate each of the plurality of winding units, and each of the plurality of unit accommodating portions extends in a rotary axis direction and is arranged in a circumferential direction around a rotary axis.

2. The rotor according to claim 1, further comprising a closing member configured to close an opening at an end in a rotary axis direction in each of the plurality of unit accommodating portions.

3. The rotor according to claim 1, further comprising a plurality of permanent magnets, wherein the rotor core includes a plurality of magnet accommodating portions configured to individually accommodate each of the plurality of permanent magnets, each of the plurality of magnet accommodating portions extends in a rotary axis direction and is arranged in a circumferential direction around a rotary axis, and both ends of the field winding in each of the plurality of winding units are electrically connected via a diode.

4. The rotor according to claim 3, wherein each of the plurality of unit accommodating portions is disposed in a posture in which a longitudinal direction of an opening is along a radial direction around a rotary axis, each of the plurality of winding units is accommodated in the unit accommodating portion in a posture in which a longitudinal direction of a cross section is along the radial direction, each of the plurality of magnet accommodating portions is disposed such that a longitudinal direction of an opening is along a direction parallel to a tangent to an outer periphery of the rotor core, and each of the plurality of permanent magnets is accommodated in the magnet accommodating portion in a posture in which a longitudinal direction of a cross section is along a direction parallel to the tangent.

5. The rotor according to claim 3, wherein a plurality of magnet accommodating portion pairs each including a pair of the magnet accommodating portions are provided as the plurality of magnet accommodating portions, a plurality of magnet pairs each including a pair of the permanent magnets are provided as the plurality of permanent magnets, the pair of magnet accommodating portions in each of the plurality of magnet accommodating portion pairs is disposed such that a longitudinal direction of each opening is along a V shape configured to open outward in a radial direction around a rotary axis, the pair of permanent magnets in each of the plurality of magnet pairs is accommodated in the magnet accommodating portion in a posture in which a longitudinal direction of each cross section is along the V shape, each of the plurality of unit accommodating portions is disposed such that a longitudinal direction of each opening is along the radial direction, and each of the plurality of winding units is accommodated in the unit accommodating portion in a posture in which each cross section is along the radial direction.

6. The rotor according to claim 3, wherein a plurality of unit accommodating portion pairs each including a pair of the unit accommodating portions are provided as the plurality of unit accommodating portions, a plurality of unit pairs each including a pair of the winding units are provided as the plurality of winding units, the pair of unit accommodating portions in each of the plurality of unit accommodating portion pairs is disposed such that a longitudinal direction of each opening is along a V shape configured to open outward in a radial direction around a rotary axis, and the pair of winding units in each of the plurality of unit pairs is accommodated in the unit accommodating portion in a posture in which a longitudinal direction of each cross section is along a V shape configured to open outward in the radial direction.

7. The rotor according to claim 6, wherein a plurality of magnet accommodating portion pairs each including a pair of the magnet accommodating portions are provided as the plurality of magnet accommodating portions, a plurality of magnet pairs each including a pair of the permanent magnets are provided as the plurality of permanent magnets, the pair of magnet accommodating portions in each of the plurality of magnet accommodating portion pairs is disposed such that a longitudinal direction of each opening is along a V shape configured to open outward in the radial direction, and the pair of permanent magnets in each of the plurality of magnet pairs is accommodated in the magnet accommodating portion in a posture in which a longitudinal direction of each cross section is along a V shape configured to open outward in the radial direction.

8. A rotating machine comprising:

a rotor configured to rotate around a rotary axis;

a shaft configured to penetrate a center of the rotor; and a stator configured to surround the rotor in a circumferential direction around the rotary axis, wherein the rotor is the rotor according to claim 1.

* * * * *